(12) United States Patent
Waslo et al.

(10) Patent No.: US 10,683,809 B2
(45) Date of Patent: Jun. 16, 2020

(54) IMPELLER-MOUNTED VORTEX SPOILER

(71) Applicant: General Electric Company, Schenectady, NY (US)

(72) Inventors: Daniel Waslo, Marblehead, MA (US); Michael Richardson-Bach, Marblehead, MA (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 15/150,628

(22) Filed: May 10, 2016

(65) Prior Publication Data

US 2017/0328283 A1 Nov. 16, 2017

(51) Int. Cl.
| | |
|---|---|
| *F02C 9/18* | (2006.01) |
| *F01D 5/04* | (2006.01) |
| *F02C 3/08* | (2006.01) |
| *F02C 3/05* | (2006.01) |
| *F02C 6/08* | (2006.01) |
| *F01D 5/02* | (2006.01) |
| *F01D 9/04* | (2006.01) |

(Continued)

(52) U.S. Cl.
CPC .................. *F02C 9/18* (2013.01); *F01D 5/02* (2013.01); *F01D 5/04* (2013.01); *F01D 9/04* (2013.01); *F01D 25/12* (2013.01); *F02C 3/04* (2013.01); *F02C 3/05* (2013.01); *F02C 3/08* (2013.01); *F02C 6/08* (2013.01); *F05D 2220/32* (2013.01); *F05D 2240/127* (2013.01); *F05D 2260/20* (2013.01); *F05D 2260/209* (2013.01); *Y02T 50/676* (2013.01)

(58) Field of Classification Search
CPC ...... F02C 3/05; F02C 3/08; F02C 9/18; F02C 6/08; F01D 5/04; F01D 25/12; F04D 17/10
See application file for complete search history.

(56) References Cited

U.S. PATENT DOCUMENTS 3,065,954 A * 11/1962 Whitaker ................ F01D 5/045
                                                                            415/218.1
3,085,400 A *  4/1963 Leis ......................... F02C 7/18
                                                                            415/115

(Continued)

OTHER PUBLICATIONS

Extended European Search Report and Opinion issued in connection with corresponding EP Application No. 17169289.0 dated Oct. 18, 2017.

*Primary Examiner* — Carlos A Rivera
(74) *Attorney, Agent, or Firm* — Dority & Manning, P.A.

(57) ABSTRACT

The present disclosure is directed to a system for bleeding air from a compressed gas path of a gas turbine engine. The system includes an impeller positioned at a downstream end of a compressor in the gas turbine engine. The impeller includes an impeller hub, an impeller arm coupled to the impeller hub, and a plurality of circumferentially spaced apart impeller vanes extending radially outwardly from the impeller arm. The impeller arm defines an impeller arm aperture extending therethrough. A vortex spoiler is positioned radially inwardly from the impeller arm and defines a vortex spoiler passage extending radially therethrough. Bleed air flows from the compressed gas path radially inwardly through both the impeller arm aperture and the vortex spoiler passage.

18 Claims, 6 Drawing Sheets

(51) Int. Cl.
*F01D 25/12* (2006.01)
*F02C 3/04* (2006.01)

(56) References Cited

U.S. PATENT DOCUMENTS

| | | | |
|---|---|---|---|
| 4,416,581 A * | 11/1983 | Geary, Jr. | ............... F01D 5/087 |
| | | | 415/1 |
| 5,555,721 A | 9/1996 | Bourneuf et al. | |
| 5,619,850 A | 4/1997 | Palmer et al. | |
| 5,997,244 A | 12/1999 | Gebre-Giorgis et al. | |
| 6,361,277 B1 | 3/2002 | Bulman et al. | |
| 6,398,487 B1 | 6/2002 | Wallace et al. | |
| 6,773,225 B2 | 8/2004 | Yuri et al. | |
| 6,938,407 B2 | 9/2005 | Beutin et al. | |
| 6,966,191 B2 * | 11/2005 | Fukutani | ................... F01D 3/02 |
| | | | 60/39.08 |
| 7,500,364 B2 | 3/2009 | Schumacher et al. | |
| 7,708,519 B2 * | 5/2010 | Mignano | ................. F01D 5/081 |
| | | | 415/115 |
| 8,453,463 B2 * | 6/2013 | Grewal | .................... F01D 5/08 |
| | | | 415/115 |
| 8,894,360 B2 | 11/2014 | Pegouet | |
| 8,920,128 B2 * | 12/2014 | Matwey | .................. F01D 5/046 |
| | | | 416/231 R |
| 9,091,173 B2 | 7/2015 | Mosley et al. | |
| 9,611,862 B2 * | 4/2017 | Brillet | ..................... F01D 25/08 |
| 2009/0282834 A1 * | 11/2009 | Hein | ....................... F01D 5/081 |
| | | | 60/772 |
| 2010/0154433 A1 * | 6/2010 | Ottaviano | ................. F02C 3/08 |
| | | | 60/785 |
| 2010/0158668 A1 * | 6/2010 | Ottaviano | ................. F02C 3/08 |
| | | | 415/104 |
| 2010/0232953 A1 * | 9/2010 | Anderson | ................. F02C 3/08 |
| | | | 415/199.2 |
| 2012/0036865 A1 * | 2/2012 | Brillet | ..................... F01D 25/08 |
| | | | 60/785 |
| 2016/0131144 A1 * | 5/2016 | Del Donno | ............ F01D 5/025 |
| | | | 416/219 R |
| 2017/0248155 A1 * | 8/2017 | Parker | ................... F04D 29/682 |

* cited by examiner

IMPELLER-MOUNTED VORTEX SPOILER

FIELD OF THE INVENTION

The present disclosure relates generally to a gas turbine engine and, more particularly, to a system for bleeding air from a compressed gas path of a gas turbine engine.

BACKGROUND OF THE INVENTION

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

The compressor section may include one or more axially spaced apart stages. Each stage may include a row of circumferentially spaced apart stator vanes and a row of circumferentially spaced apart rotor blades positioned downstream of the row of stator vanes. The stator vanes direct the air flowing through the compressor section onto the rotor blades, which impart kinetic energy into the air to increase the pressure thereof.

In particular configurations, compressed air may be bled from the compressor section for a variety of uses, such as pressurizing sumps and/or cooling various components (e.g., components in the turbine section). Typically, this air is bled from the outer periphery of the compressor section, thereby requiring a complex piping system to route the bleed air to the appropriate location (e.g., a sump). This external piping system is undesirable as it increases the weight, complexity, and overall cost of the gas turbine engine.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a system for bleeding air from a compressed gas path of a gas turbine engine. The system includes an impeller positioned at a downstream end of a compressor in the gas turbine engine. The impeller includes an impeller hub, an impeller arm coupled to the impeller hub, and a plurality of circumferentially spaced apart impeller vanes extending radially outwardly from the impeller arm. The impeller arm defines an impeller arm aperture extending therethrough. A vortex spoiler is positioned radially inwardly from the impeller arm and defines a vortex spoiler passage extending radially therethrough. Bleed air flows from the compressed gas path radially inwardly through both the impeller arm aperture and the vortex spoiler passage.

A further aspect of the present disclosure is directed to a gas turbine engine. The gas turbine engine includes a combustion section, a turbine, and a compressor defining a compressed gas path. The compressor includes an impeller having an impeller hub, an impeller arm coupled to the impeller hub, and a plurality of circumferentially spaced apart impeller vanes extending radially outwardly from the impeller arm. The impeller arm defines an impeller arm aperture extending therethrough. A vortex spoiler is positioned radially inwardly from the impeller arm and defines a vortex spoiler passage extending radially therethrough. Bleed air flows from the compressed gas path radially inwardly through both the impeller arm aperture and the vortex spoiler passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
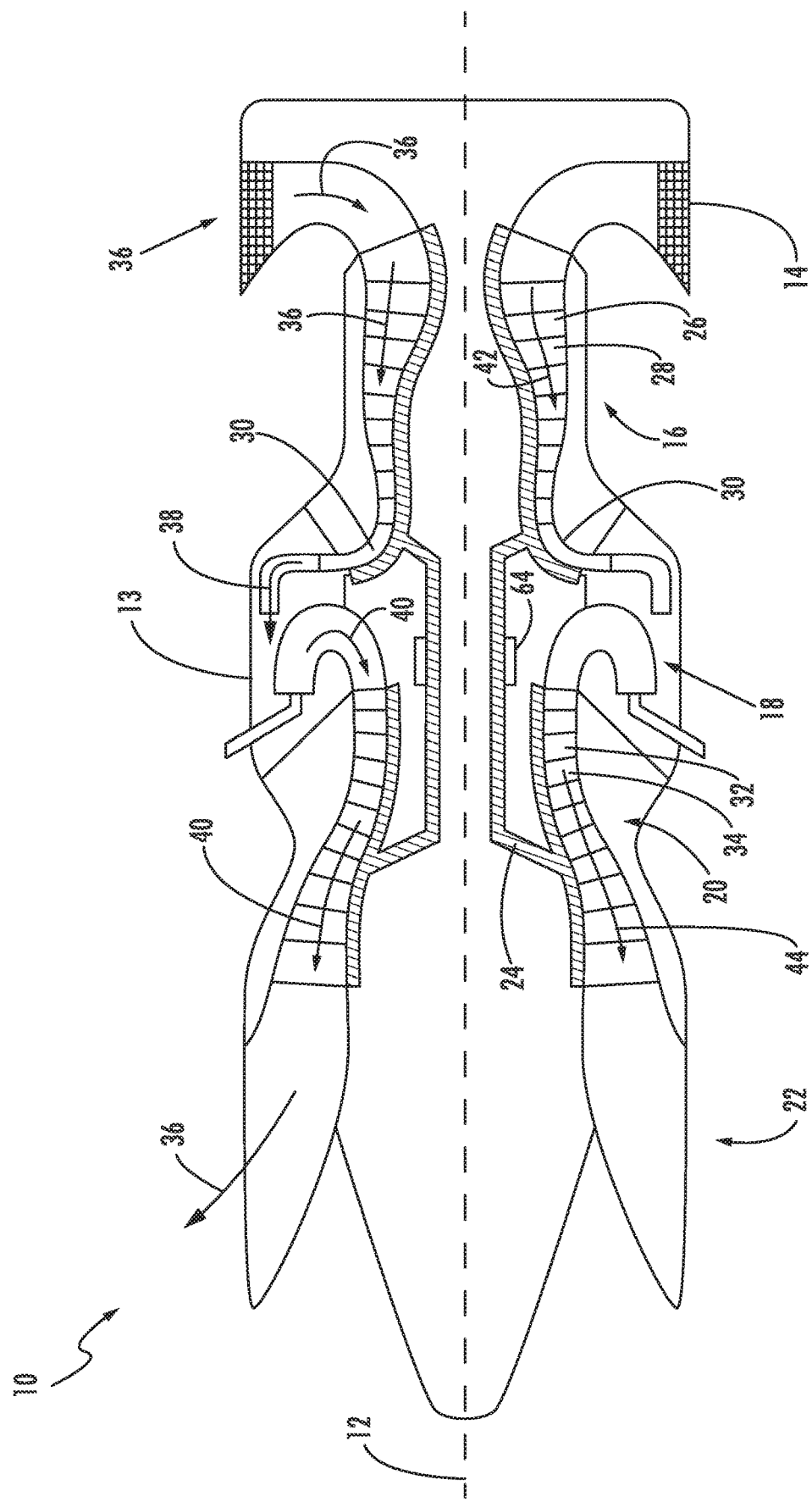
FIG. 1 is a schematic cross-sectional view of an exemplary gas turbine engine in accordance with the embodiments disclosed herein.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of an exemplary gas turbine engine 10 as may incorporate various embodiments disclosed herein. As shown in FIG. 1, the gas turbine engine 10 defines a longitudinal or axial centerline axis 12 extending therethrough for reference.

The gas turbine engine 10 may generally include a substantially tubular outer casing 13 that defines an annular inlet 14. The outer casing 13 may be formed from a single casing or multiple casings. The outer casing 13 encloses, in serial flow relationship, a compressor 16, a combustion section 18, a turbine 20, and an exhaust section 22. The compressor 16 includes one or more sequential stages of compressor stator vanes 26, one or more sequential stages of compressor blades 28, and an impeller 30, which define a compressed gas path 42. The turbine 20 includes one or more sequential stages of turbine stator vanes 32 and one or more sequential stages of turbine blades 34, which define a hot gas path 44. A shaft or spool 24 drivingly couples the turbine 20 and the compressor 16. The shaft 24 may be formed from a single shaft or multiple shaft segments. One or more bearings (not shown) may be positioned in one or more sumps 64 to rotatably support the shaft 24.

Although not shown, the gas turbine engine 10 may include multiple compressors and/or multiple turbines. In some embodiments, for example, the gas turbine engine 10 may include a high pressure compressor (not shown) coupled to a high pressure turbine (not shown) by a high pressure spool (not shown) and a low pressure compressor (not shown) coupled to a low pressure turbine (not shown) by a low pressure spool (not shown).

Air 36 enters the inlet portion 14 of the gas turbine engine 10 during operation thereof. The air 36 flows into the compressor 16 where the one or more sequential stages of compressor stator vanes 26 and compressor blades 28 coupled to the shaft 24 progressively compress the air 36 flowing through the compressed gas path 42. The impeller 30 directs this now compressed air 38 into the combustion section 18 where it mixes with fuel and burns to provide combustion gases 40. The combustion gases 40 flow through the turbine 20 where the one or more sequential stages of turbine stator vanes 32 and turbine blades 34 coupled to the shaft 24 extract kinetic and/or thermal energy therefrom. This energy extraction supports operation of the compressor 16. The combustion gases 40 then exit the gas turbine engine 10 through the exhaust section 22 thereof.

Although the gas turbine engine 10 described above is a turbojet engine for use in an aircraft or helicopter, the gas turbine engine 10 may be any suitable type of gas turbine or be used in any application. For example, the gas turbine engine 10 may by a high bypass turbofan, an unducted turbofan, or an industrial gas turbine used for electricity generation.

Figure 2:
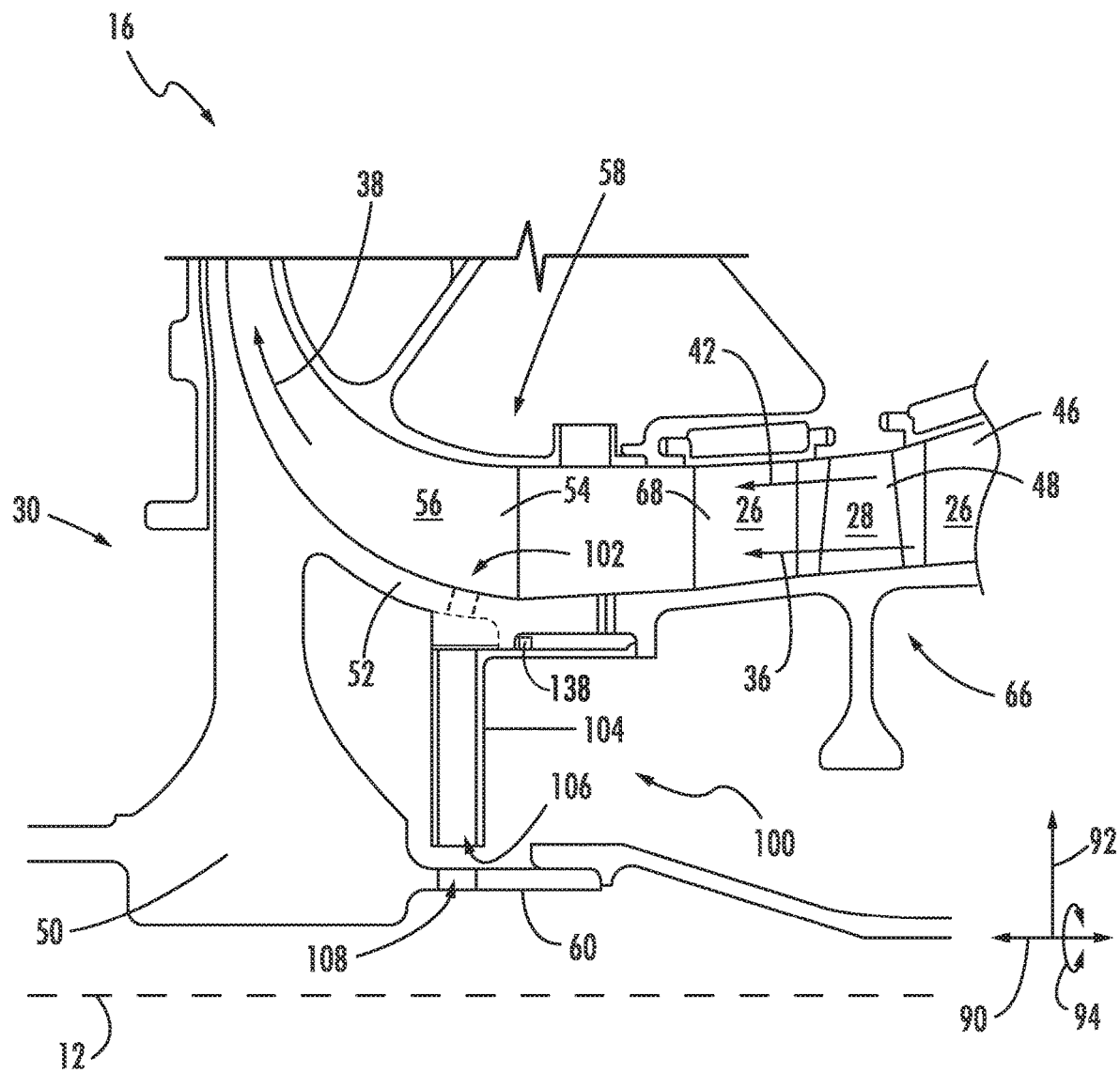
FIG. 2 is a cross-sectional side view of a compressor of the gas turbine engine shown in FIG. 1, illustrating an impeller and one embodiment of a system for bleeding compressed air from a compressed gas path.

FIG. 2 illustrates a downstream portion of the compressor 16 in greater detail. As depicted therein, the compressor 16 defines an axial direction 90, a radial direction 92, and a circumferential direction 94. In general, the axial direction 90 extends parallel to the longitudinal axis 12, the radial direction 92 extends orthogonally outwardly from the longitudinal axis 12, and the circumferential direction 94 extends concentrically around the longitudinal axis 12.

The compressor 16 includes one or more sequential stages. For the purposes of clarity, FIG. 2 shows only a last stage 66 (i.e., the furthest downstream stage) of the compressor 16. Nevertheless, the compressor 16 may include as many stages positioned upstream of the stage 66 as is necessary or desired (e.g., zero, one, two, three, etc.). The stage 66 includes a row 46 of circumferentially spaced apart compressor stator vanes 26 and a row 48 of circumferentially spaced apart compressor blades 28 axially spaced apart and positioned downstream of the row 46 of compressor stator vanes 26. The embodiment shown in FIG. 2 also includes a row 68 of compressor stator vanes 26 positioned downstream of the row 48 of compressor blades 28, although some embodiments may not include the row 68.

As mentioned above, the compressor 16 includes the impeller 30 is positioned at a downstream end 58 of the compressor 16 for directing the compressed air 38 into the combustion section 18. More specifically, the impeller 30 includes an impeller hub 50 and an impeller arm 52 extending axially and radially outwardly from the impeller hub 50. A row 54 of circumferentially spaced apart impeller vanes 56 extend radially outwardly from the impeller arm 52. In some embodiments, the impeller 30 may optionally include an impeller extension 60 that extends axially outward from the impeller hub 50 in the upstream direction. The impeller extension 60, if included, is positioned radially inward from and is radially spaced apart from the impeller arm 52.

The rows 46, 68 of the compressor stator vanes 26, the row 48 of the compressor blades 28, and the row 54 of impeller vanes 56 collectively define the compressed gas path 42 through which the air 36 flows. In particular, the compressor stator vanes 26 direct the air 36 onto the compressor blades 28, which impart kinetic energy into the air 36. In this respect, the compressor blades 28 convert the air 36 flowing through the compressor 16 into the compressed air 38. The impeller vanes 56 direct the flow of the compressed air 38 into the combustion section 18.

Figure 3:
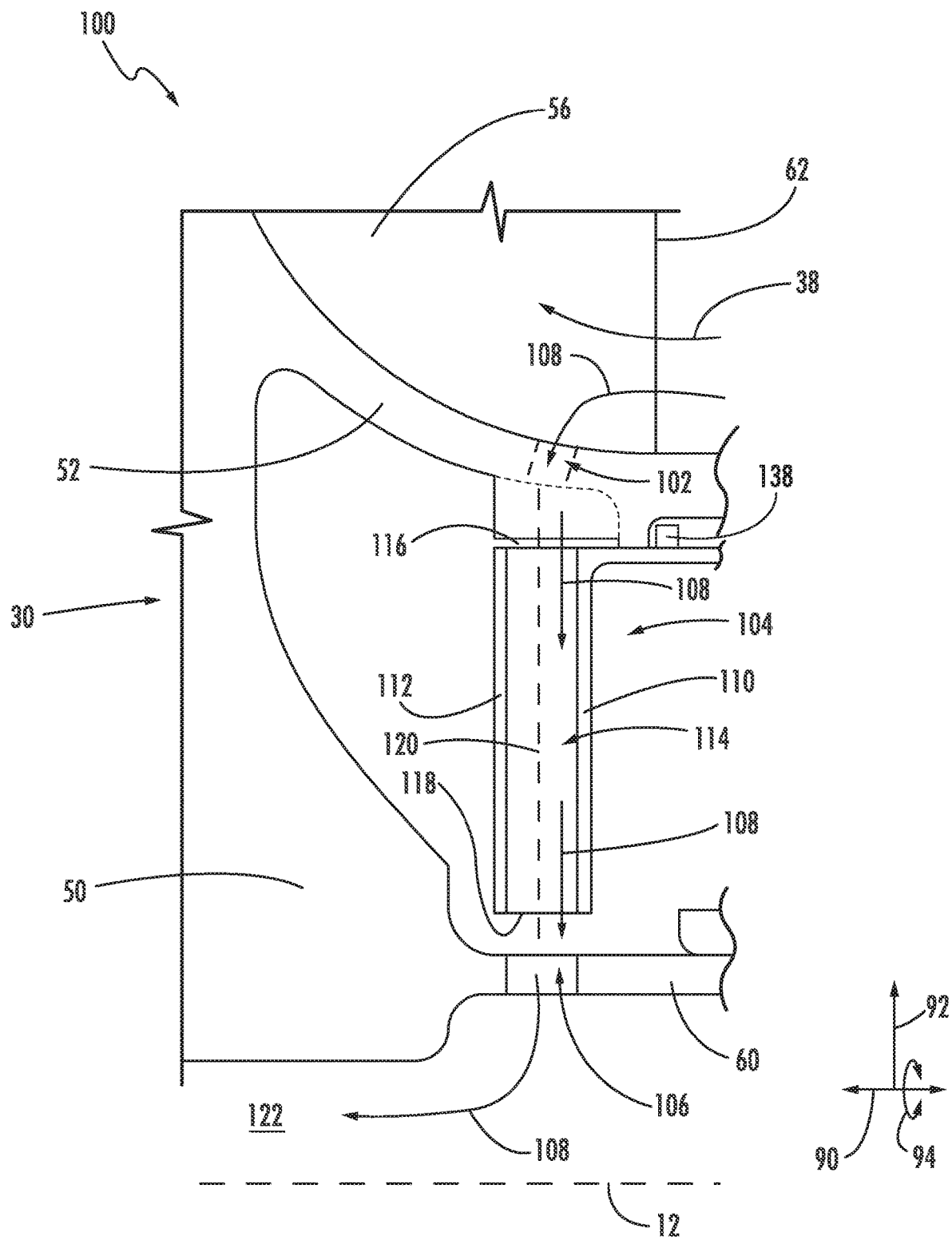
FIG. 3 is a close-up cross-sectional side view of the embodiment of the system for bleeding compressed air from the compressed gas path shown in FIG. 2, illustrating one or more impeller arm apertures, a vortex spoiler, and one or more impeller extension apertures.

FIGS. 2 and 3 illustrate one embodiment of a system 100 for bleeding a portion of the air 36 from the compressed gas path 42 of the gas turbine engine 10. The portion of the air 36 that the system 100 bleeds from the compressed gas path 42 will be hereinafter referred to as bleed air 108. As will be discussed in greater detail below, the system 100 includes one or more impeller arm apertures 102, a vortex spoiler 104, and, optionally, one or more impeller extension apertures 106. In this respect, the bleed air 108 from the compressed gas path 42 flows through the one or more impeller arm apertures 102 into the vortex spoiler 104. The bleed air 108 then flows from the vortex spoiler 104 through the one or more impeller extension apertures 106, if included, and into a cavity 122 defined by and positioned between the impeller hub 50 and the centerline 12. From there, the bleed air 108 may be used for any suitable purpose such as pressurizing a sump (e.g., the sump 64) or cooling various components of the gas turbine engine 10.

Figure 4:
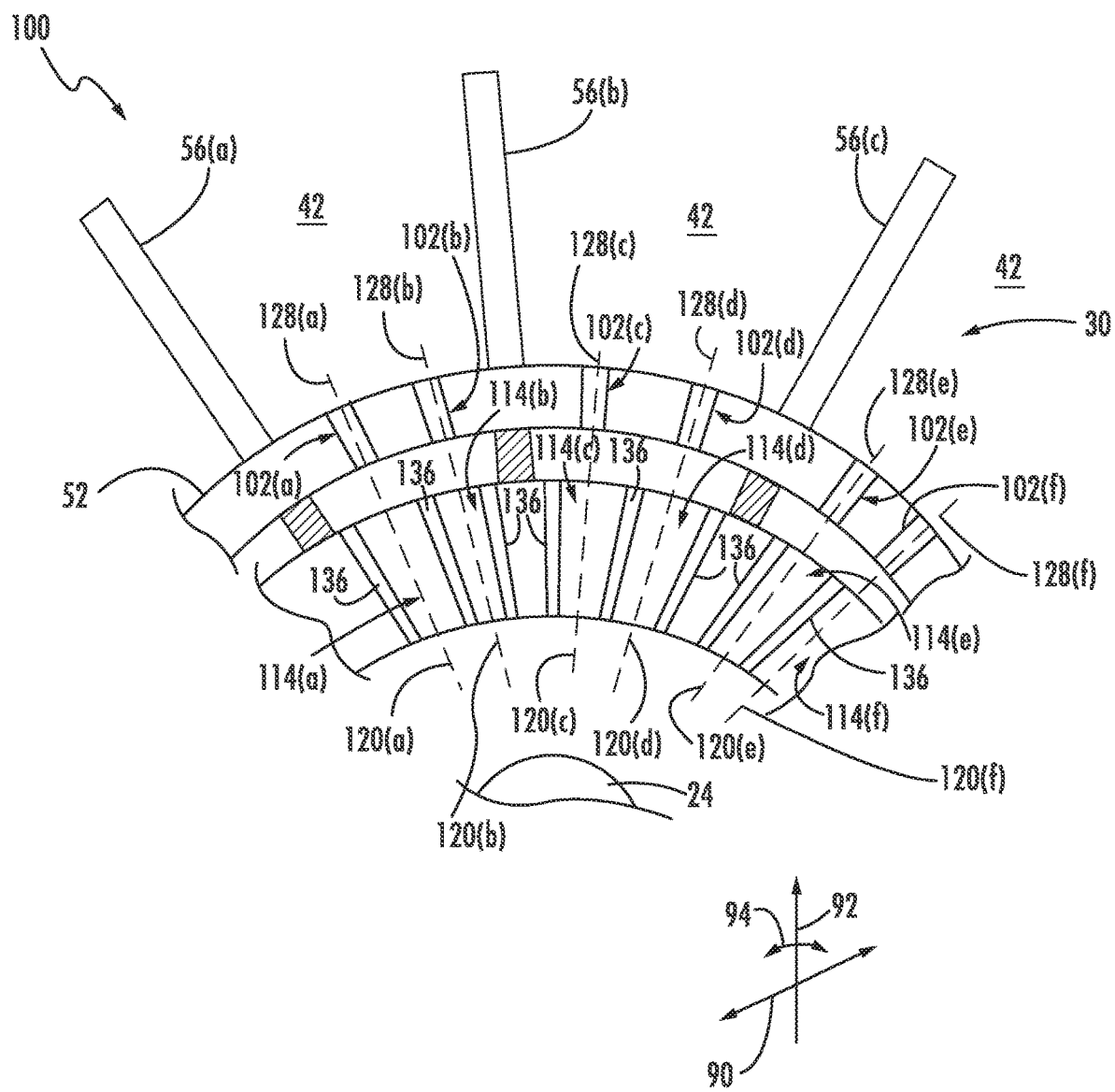
FIG. 4 is a front view of the impeller shown in FIG. 2, illustrating the relative positioning of the one or more impeller arm apertures and the vortex spoiler.

FIG. 4 is a front view of the impeller 30, illustrating one embodiment of the positioning of the one or more impeller arm apertures 102. More specifically, in the embodiment shown in FIG. 4, the impeller arm 52 defines a plurality of the impeller arm apertures 102, and each of the plurality of impeller arm apertures 102 shown in FIG. 4 is positioned circumferentially between an adjacent pair of impeller vanes 56. That is, each of the plurality of impeller arm apertures 102 is circumferentially offset from each of the plurality of impeller vanes 56. Furthermore, the impeller arm apertures 102 may be positioned downstream of and axially spaced apart from a leading edge 62 of each of the one or more impeller vanes 56 as shown in FIG. 3.

As shown in FIG. 4, multiple impeller arm apertures 102 may be positioned circumferentially between each pair of adjacent impeller vanes 56 in some embodiments. In FIG. 4, for example, a first impeller arm aperture 102(a) and a second impeller arm aperture 102(b) are positioned circumferentially between a first impeller vane 56(a) and a second impeller vane 56(b) adjacent to the first impeller vane 56(a). A third impeller arm aperture 102(c) and a fourth impeller arm aperture 102(d) are positioned circumferentially between the second impeller vane 56(b) and a third impeller vane 56(c) adjacent to the second impeller vane 56(b). A fifth impeller arm aperture 102(e) and a sixth impeller arm aperture 102(f) are positioned circumferentially between the third impeller vane 56(c) and a fourth impeller vane (not shown) adjacent to the third impeller vane 56(c). In other embodiments, however, more or less impeller arm apertures 102 may be positioned between each adjacent pair of impeller vanes 56. In some embodiments, at least one of the plurality of impeller arm apertures 102 is positioned between each and every adjacent pair of the impeller vanes 56. Nevertheless, the impeller arm 52 may define as many or as few impeller arm apertures 102 as is necessary or desired so long as the impeller arm 52 defines at least one impeller arm aperture 102.

Figure 5:
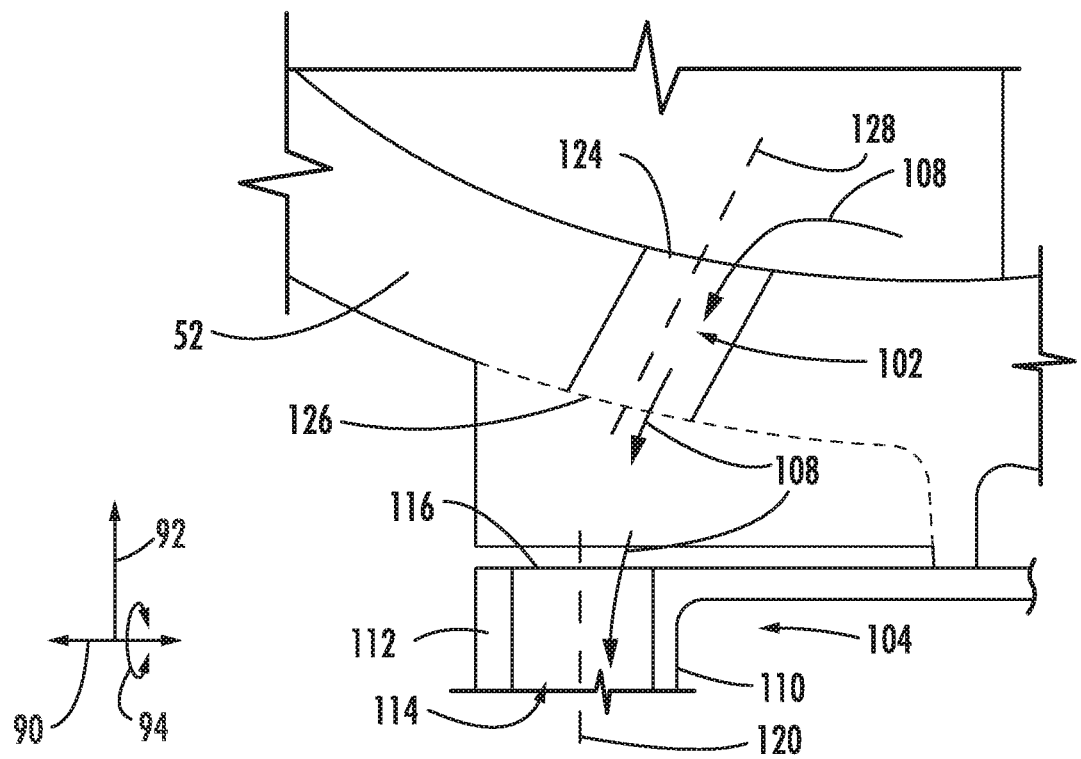
FIG. 5 is a close-up cross-sectional view of one of the one or more impeller arm apertures shown in FIGS. 3 and 4, illustrating various features thereof.

FIG. 5 illustrates one of the impeller arm apertures 102 in greater detail. The impeller arm aperture 102 permits fluid communication between the compressed gas path 42 and the vortex spoiler 104. In this respect, the impeller arm aperture 102 extends from an inlet 124 through the impeller arm 52 to an outlet 126 and defines a longitudinal axis 128 extending therethrough. In the embodiment shown in FIG. 4, the outlet 126 is axially spaced apart from and positioned downstream of the inlet 124. That is, the one or more impeller arm apertures 102 extend through the impeller arm 52 in both the axial and radial directions 90, 92. Nevertheless, the inlet 124 and the outlet 126 may be axially aligned in other embodiments (i.e., extend through the impeller arm 52 in only the radial direction 92). The impeller arm apertures 102 may have any suitable cross-sectional shape (e.g., circular, oval, rectangular, etc.).

As mentioned above and illustrated in FIGS. 3 and 4, the vortex spoiler 104 is positioned radially between the impeller arm 52 and the centerline 12. In embodiments that include the impeller extension 60, the vortex spoiler 104 is positioned between the impeller arm 52 and the impeller extension 60. The vortex spoiler 104 defines one or more vortex spoiler passages 114 extending radially therethrough. In this respect, the bleed air 108 exiting the one or more impeller arm apertures 102 flows through the one or more vortex spoiler passages 114 en route to the cavity 122 between the impeller hub 50 and the centerline 12. A retention bump 138 may couple the vortex spoiler 104 to the impeller arm 56.

Figure 6:
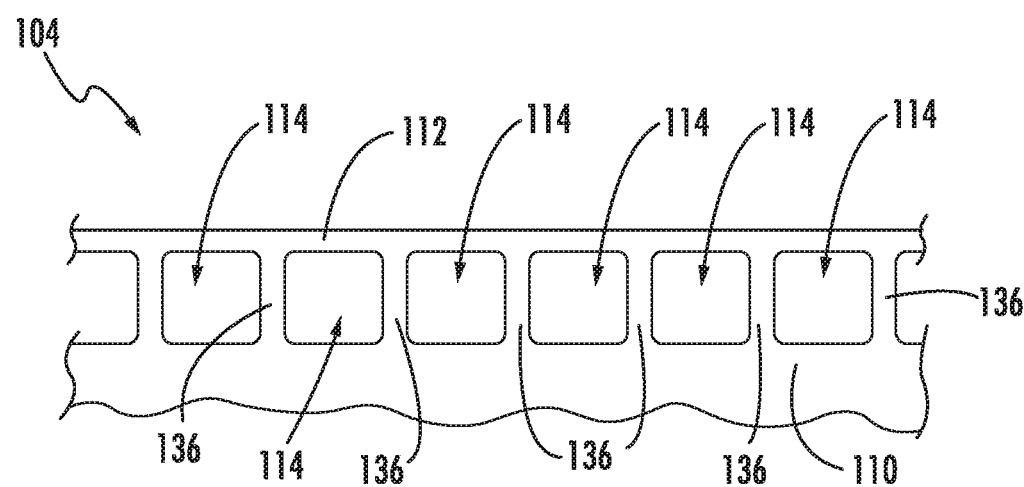
FIG. 6 is a top view of the vortex spoiler shown in FIGS. 3 and 4, illustrating various features thereof.

FIGS. 3 and 6 illustrate one embodiment of the vortex spoiler 104 defining a plurality of vortex spoiler passages 114. More specifically, the vortex spoiler 104 includes a first annular wall 110 and a second annular wall 112 axially spaced apart from the first annular wall 110. A plurality of radially-extending fins 136 extends from the first annular wall 110 to the second annular wall 112. In this respect, the first annular wall 110, the second annular wall 112, and an adjacent pair of the plurality of fins 136 collectively define each of the one or more vortex spoiler passages 114 having an inlet 116 and an outlet 118. In this respect, the number of fins 136 controls the number of vortex spoiler passages 114 extending through the vortex spoiler 104. In some embodiments, the vortex spoiler 104 defines as many vortex spoiler passages 114 as there are impeller arm apertures 102. Nevertheless, the vortex spoiler 104 may define more vortex spoiler passages 114 than there are impeller arm apertures 102 (e.g., a single impeller arm aperture 102 feeds into multiple vortex spoiler passages 114) or the vortex spoiler 104 may define less vortex spoiler passages 114 than there are impeller arm apertures 102 (e.g., multiple impeller arm apertures 102 feed into a single vortex spoiler passages 114). The vortex spoiler passages 114 may have any suitable cross-sectional shape (e.g., circular, rectangular, triangular, etc.).

Referring again to FIGS. 3 and 4, each of impeller arm apertures 102 are axially with and radially spaced apart from a corresponding one of the plurality of vortex spoiler passages 114. More particularly, each of the plurality of vortex spoiler passages 114 extending through the vortex spoiler 104 defines a longitudinal axis 120. In the embodiment shown in FIG. 4, for example, the vortex spoiler 104 includes a first vortex spoiler passage 114(a) defining a first longitudinal axis 120(a), a second vortex spoiler passage 114(b) defining a second longitudinal axis 120(b), a third vortex spoiler passage 114(c) defining a third longitudinal axis 120(c), a fourth vortex spoiler passage 114(d) defining a fourth longitudinal axis 120(d), a fifth vortex spoiler passage 114(e) defining a fifth longitudinal axis 120(e), and a sixth vortex spoiler passage 114(f) defining a sixth longitudinal axis 120(f). Similarly, the first impeller arm aperture 102(a) defines a first longitudinal axis 128(a), the second impeller arm aperture 102(b) defines a second longitudinal axis 128(b), the third impeller arm aperture 102(c) defines a third longitudinal axis 128(c), the fourth impeller arm aperture 102(d) defines a fourth longitudinal axis 128(d), the fifth impeller arm aperture 102(e) defines a fifth longitudinal axis 128(e), and the sixth impeller arm aperture 102(f) defines a sixth longitudinal axis 128(f). Accordingly, the longitudinal axis 120(a-f) of each of the vortex spoiler passages 114(a-f) is collinear with the longitudinal axis 128(a-f) of the corresponding impeller arm aperture 102(a-f). That is, the first longitudinal axis 120(a) is collinear with the first longitudinal axis 128(a), the second longitudinal axis 120(b) is collinear with the second longitudinal axis 128(b), the third longitudinal axis 120(c) is collinear with the third longitudinal axis 128(c), the fourth longitudinal axis 120(d) is collinear with the fourth longitudinal axis 128(d), the fifth longitudinal axis 120(e) is collinear with the fifth longitudinal axis 128(e), and the sixth longitudinal axis 120(f) is collinear with the sixth longitudinal axis 128(f). As shown in FIG. 4, the vortex spoiler 104 may define one or more vortex spoiler passages 114 that do not axially and circumferentially align with one of the one or more impeller arm apertures 102 (e.g., the vortex spoiler passage positioned between the second and the third vortex spoiler passages 114(b), 114(c)).

Figure 7:
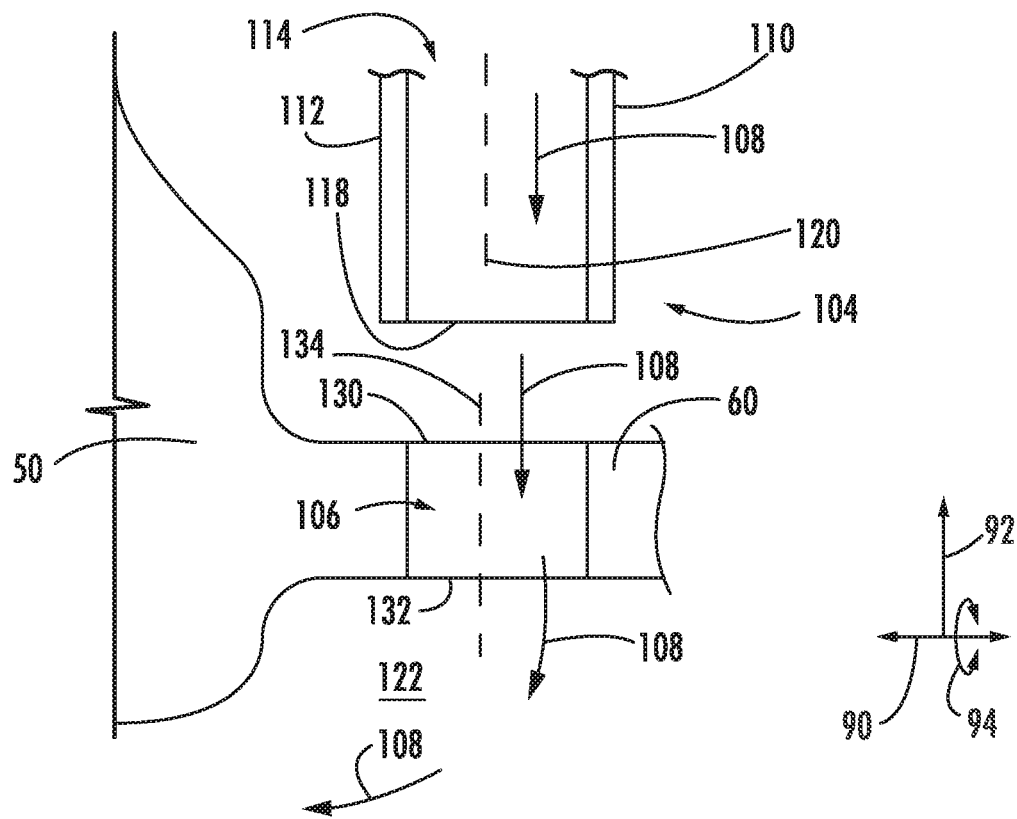
FIG. 7 is a close-up cross-sectional view of one of the one or more impeller extension apertures shown in FIG. 3, illustrating various features thereof.

FIG. 7 illustrates the one or more impeller extension apertures 106 in greater detail. The one or more impeller extension apertures 106, if included, permit fluid communication between the vortex spoiler 104 and the cavity 122 between the impeller hub 50 and the centerline 12. As mentioned above, the impeller extension 60, if included, extends axially outward from the impeller hub 50 in the upstream direction. Each of the one or more impeller extension apertures 106 extends from an inlet 130 through the impeller extension 60 to an outlet 132 and defines a longitudinal axis 134 extending therethrough. In the embodiment shown in FIG. 7, the inlet 130 and the outlet 132 are axially aligned. Nevertheless, in other embodiments, the inlet 130 and the outlet 132 may be axially spaced apart. Furthermore, each of the impeller extension apertures 106 may be axially aligned with, circumferentially aligned with, and radially spaced apart from a corresponding one of the plurality of vortex spoiler passages 114. That is, the longitudinal axis 134 of each of the impeller extension apertures 106 may be collinear with the longitudinal axis 120 of the corresponding vortex spoiler passage 114. The impeller extension apertures 106 may have any suitable shape (e.g., circular, oval, rectangular, etc.). In embodiments that do not include the impeller arm extension 60, the bleed air 108 exiting the vortex spoiler passages 114 flows directly into the cavity 122 between the impeller hub 50 and the centerline 12.

As mentioned above, the bleed air 108 exits the compressed gas path 42 through the one or more impeller arm apertures 102 and then flows through the vortex spoiler 104 and the one or more impeller extension apertures 106, if included, into the cavity 122 between the impeller hub 50 and the centerline 12. In this respect, the system 100 draws the bleed air 108 through the impeller arm apertures 102 in the impeller arm 52 and directs the bleed air 108 into the radially inner portions of the gas turbine engine 10 (i.e., the cavity 122). As such, the bleed air 108 is internally routed through the gas turbine engine 10 (i.e., through the cavity 122 between the impeller hub 50 and the centerline 12) to the appropriate location (e.g., the sump 64). Therefore, the system 100 eliminates the need for a complex external piping system to route the bleed air 108, thereby reducing the weight, cost, and complexity of the gas turbine engine 10 in comparison to gas turbine engines employing conventional systems to bleed air from the compressor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for bleeding air from a compressed gas path of a gas turbine engine, the system comprising:
    an impeller positioned at a downstream end of a compressor in the gas turbine engine, the impeller comprising an impeller hub, an impeller arm coupled to the impeller hub, an impeller extension that defines an impeller extension aperture, and a plurality of circumferentially spaced apart impeller vanes extending radially outwardly from the impeller arm, wherein the impeller arm defines an impeller arm aperture extending therethrough, the impeller arm aperture comprising an impeller arm aperture inlet and an impeller arm aperture outlet; and
    a vortex spoiler positioned radially inwardly from the impeller arm, the vortex spoiler defining a vortex spoiler passage extending radially therethrough, the vortex spoiler passage comprising a vortex spoiler passage aperture inlet that is radially spaced apart from the impeller arm aperture outlet;
    wherein bleed air flows from the compressed gas path radially inwardly through both the impeller arm aperture and the vortex spoiler passage;
    wherein the impeller arm defines a plurality of impeller arm apertures extending therethrough, and the vortex spoiler defines a plurality of vortex spoiler passages extending therethrough;
    wherein each of the plurality of the impeller arm apertures are axially and circumferentially aligned with one of the plurality of vortex spoiler passages;
    wherein the impeller extension aperture is axially aligned with the vortex spoiler passage; and
    wherein the impeller extension is spaced away from the vortex spoiler in a radial direction.

2. The system of claim 1, wherein the impeller arm aperture is positioned downstream of a leading edge of each of the plurality of impeller vanes.

3. The system of claim 1, wherein the impeller arm aperture is positioned circumferentially between an adjacent pair of the plurality of the impeller vanes.

4. The system of claim 1, wherein the impeller arm aperture inlet is spaced apart from the impeller arm aperture outlet, and wherein the impeller arm aperture outlet is positioned axially downstream of the impeller arm aperture inlet.

5. The system of claim 1, wherein the vortex spoiler comprises a first annular wall, a second annular wall axially spaced apart from the first annular wall, and a plurality of circumferentially spaced apart fins extending from the first annular wall to the second annular wall.

6. The system of claim 1, wherein one of the plurality of impeller arm apertures is positioned circumferentially between every adjacent pair of the plurality of impeller vanes.

7. The system of claim 1, wherein the impeller extension extends axially outwardly from the impeller hub and is positioned radially inwardly from the vortex spoiler, the impeller extension defines the impeller extension aperture extending radially therethrough, and wherein bleed air flows from the vortex spoiler passage through the impeller extension aperture.

8. The system of claim 7, wherein the vortex spoiler passage defines a longitudinal axis and the impeller extension aperture defines a longitudinal axis, and wherein the longitudinal axis of the vortex spoiler passages is collinear with the longitudinal axis of the impeller extension aperture.

9. The system of claim 1, wherein the bleed air exiting the vortex spoiler passage flows downstream through a cavity defined by the impeller hub and a shaft.

10. The system of claim 1, wherein the bleed air exiting the vortex spoiler pressurizes a sump.

11. The system of claim 1, wherein the vortex spoiler further defines an offset vortex spoiler passage that is axially and circumferentially offset from the impeller arm apertures.

12. A gas turbine engine, comprising:
    a combustion section;
    a turbine; and
    a compressor defining a compressed gas path, comprising:
        an impeller comprising an impeller hub, an impeller arm coupled to the impeller hub, an impeller extension that defines an impeller extension aperture, and a plurality of circumferentially spaced apart impeller vanes extending radially outwardly from the impeller arm, wherein the impeller arm defines an impeller arm aperture extending therethrough, the impeller arm aperture comprising an impeller arm aperture inlet and an impeller arm aperture outlet; and
        a vortex spoiler positioned radially inwardly from the impeller arm, the vortex spoiler defining a vortex spoiler passage extending radially therethrough, the vortex spoiler passage comprising a vortex spoiler passage aperture inlet that is radially spaced apart from the impeller arm aperture outlet;

wherein bleed air flows from the compressed gas path radially inwardly through both the impeller arm aperture and the vortex spoiler passage;

wherein the impeller arm defines a plurality of impeller arm apertures extending therethrough and the vortex spoiler defines a plurality of vortex spoiler passages extending therethrough;

wherein each of the plurality of the impeller arm apertures are axially and circumferentially aligned with one of the plurality of vortex spoiler passages;

wherein the vortex spoiler further defines an offset vortex spoiler passage that is circumferentially offset from the impeller arm apertures; and wherein the impeller extension is spaced away from the vortex spoiler in a radial direction.

13. The gas turbine engine of claim 12, wherein the impeller arm aperture is positioned circumferentially between an adjacent pair of the plurality of the impeller vanes and downstream from a leading edge of each of the plurality of impeller vanes.

14. The gas turbine engine of claim 12, wherein the impeller arm aperture inlet is spaced apart from the impeller arm aperture outlet, and wherein the impeller arm aperture outlet is axially spaced apart from the impeller arm aperture inlet.

15. The gas turbine engine of claim 12, wherein a fin is positioned circumferentially between each adjacent pair of the plurality of vortex spoiler passages in the vortex spoiler.

16. The gas turbine engine of claim 12, wherein the impeller extension defines the impeller extension aperture extending radially therethrough, and wherein bleed air flows from the vortex spoiler passage through the impeller extension aperture.

17. The gas turbine engine of claim 12, wherein the vortex spoiler passage defines a longitudinal axis and the impeller extension aperture defines a longitudinal axis, and wherein the longitudinal axis of the vortex spoiler passages is collinear with the longitudinal axis of the impeller extension aperture.

18. The gas turbine engine of claim 12, wherein the bleed air exiting the vortex spoiler passage flows downstream through a cavity defined by the impeller hub and a centerline of the gas turbine engine to pressurize a sump.

* * * * *